(12) United States Patent
Tsuyuki et al.

(10) Patent No.: US 9,399,944 B2
(45) Date of Patent: Jul. 26, 2016

(54) CONTROL DEVICE FOR MULTI-CYLINDER INTERNAL COMBUSTION ENGINE

(75) Inventors: Takeshi Tsuyuki, Hadano (JP);
Naozumi Katou, Yokohama (JP);
Daisuke Takaki, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 276 days.

(21) Appl. No.: 13/983,686

(22) PCT Filed: Feb. 3, 2012

(86) PCT No.: PCT/JP2012/052541
§ 371 (c)(1),
(2), (4) Date: Aug. 5, 2013

(87) PCT Pub. No.: WO2012/108362
PCT Pub. Date: Aug. 16, 2012

(65) Prior Publication Data
US 2014/0000554 A1 Jan. 2, 2014

(30) Foreign Application Priority Data
Feb. 7, 2011 (JP) ................................. 2011-024138

(51) Int. Cl.
*F02D 41/04* (2006.01)
*F02D 41/36* (2006.01)
(Continued)

(52) U.S. Cl.
CPC ............ *F02B 17/00* (2013.01); *F02D 13/0261* (2013.01); *F02D 41/0007* (2013.01);
(Continued)

(58) Field of Classification Search
CPC . F02B 17/00; F02D 13/0261; F02D 41/0007; F02D 41/008; F02D 41/10; F02D 41/1458; F02D 41/182; F02D 41/0062; F02D 41/1446; F02D 41/145; F02D 2041/001; F02D 2013/0292; F02D 41/006; F02D 2200/501; F02D 2200/0402; F02D 2200/0404; F02D 2200/0414; F02D 2200/0804; Y02T 10/144; Y02T 10/18
USPC ......................................................... 701/103
See application file for complete search history.

(56) References Cited

U.S. PATENT DOCUMENTS 5,465,700 A 11/1995 Nishimoto
6,827,051 B2 * 12/2004 Kawasaki ................. F01L 9/04
123/568.14

(Continued)

FOREIGN PATENT DOCUMENTS

CN 101042085 A 9/2007
DE 10 2006 043 670 A1 9/2007

(Continued)

OTHER PUBLICATIONS

Japanese Office Action dated Apr. 22, 2014, 3 pgs.
(Continued)

*Primary Examiner* — Hieu T Vo
*Assistant Examiner* — Arnold Castro
(74) *Attorney, Agent, or Firm* — Foley & Lardner LLP

(57) ABSTRACT

Provided is a control device for a multi-cylinder internal combustion engine, including: a supercharger to be driven by exhaust gas energy; and a fuel injection control unit, in which the fuel injection control unit sets a fuel injection amount for one cylinder so that an air/fuel ratio in the one cylinder is richer than a theoretical air/fuel ratio, and exhaust gas exhausted when the one cylinder is in an exhaust stroke and scavenging gas scavenged during a valve overlap period from another cylinder which is in an intake stroke when the one cylinder is in the exhaust stroke are mixed in an exhaust pipe so as to attain an air/fuel ratio facilitating combustion.

8 Claims, 10 Drawing Sheets

(51) Int. Cl.
*F02B 17/00* (2006.01)
*F02D 41/10* (2006.01)
*F02D 41/18* (2006.01)
*F02D 13/02* (2006.01)
*F02D 41/00* (2006.01)
*F02D 41/14* (2006.01)

(52) U.S. Cl.
CPC .............. *F02D41/008* (2013.01); *F02D 41/10* (2013.01); *F02D 41/1458* (2013.01); *F02D 41/182* (2013.01); *F02D 41/006* (2013.01); *F02D 41/0062* (2013.01); *F02D 41/145* (2013.01); *F02D 41/1446* (2013.01); *F02D 2013/0292* (2013.01); *F02D 2041/001* (2013.01); *F02D 2200/0402* (2013.01); *F02D 2200/0404* (2013.01); *F02D 2200/0414* (2013.01); *F02D 2200/0804* (2013.01); *F02D 2200/501* (2013.01); *Y02T 10/144* (2013.01); *Y02T 10/18* (2013.01)

(56) References Cited

U.S. PATENT DOCUMENTS

| | | | |
|---|---|---|---|
| 7,178,327 B2 | 2/2007 | Miyashita | |
| 7,275,516 B1 | 10/2007 | Cunningham et al. | |
| 7,621,256 B2 | 11/2009 | Cunningham et al. | |
| 8,126,632 B2* | 2/2012 | Pallett | F02D 41/0007 123/434 |
| 8,495,865 B2 | 7/2013 | Okada | |
| 2005/0097888 A1* | 5/2005 | Miyashita | F02D 41/0007 60/602 |
| 2007/0256666 A1 | 11/2007 | Cunningham et al. | |
| 2008/0077304 A1* | 3/2008 | Suzuki | F02D 13/0261 701/102 |
| 2011/0126519 A1* | 6/2011 | Okada | F02D 13/0246 60/276 |
| 2011/0213539 A1* | 9/2011 | Eiraku | F02D 41/0007 701/102 |
| 2012/0316756 A1* | 12/2012 | Tsuyuki | F02D 35/023 701/104 |
| 2013/0152584 A1* | 6/2013 | Jankovic | F02D 41/1456 60/611 |
| 2013/0255631 A1* | 10/2013 | Ruhland | F02D 41/30 123/445 |
| 2013/0312714 A1* | 11/2013 | Tsuyuki | F02D 23/00 123/559.1 |

FOREIGN PATENT DOCUMENTS

| | | |
|---|---|---|
| DE | 10 2006 031 254 A1 | 1/2008 |
| JP | 2005-146893 A | 6/2005 |
| JP | 2006-046180 A | 2/2006 |
| JP | 2006-299992 A | 11/2006 |
| JP | 2008-101502 A | 5/2008 |
| JP | 2009-197759 A | 9/2009 |
| JP | 2010-24975 A | 2/2010 |
| WO | WO 2010/007512 A1 | 1/2010 |

OTHER PUBLICATIONS

Korean Office Action dated May 22, 2014, 3 pgs.
European Extended Search Report, May 23, 2014, 6 pgs.

* cited by examiner

CONTROL DEVICE FOR MULTI-CYLINDER INTERNAL COMBUSTION ENGINE

TECHNICAL FIELD

This invention relates to air/fuel ratio control for an internal combustion engine including a valve timing control mechanism and a supercharger.

BACKGROUND ART

In an internal combustion engine equipped with a turbocharger (hereinafter simply referred to as supercharger) for rotating a turbine by using an exhaust energy, it is effective to enhance a supercharging efficiency of the supercharger in order to enhance the charging efficiency. Then, in order to enhance the supercharging efficiency, it is effective to increase an exhaust gas temperature.

For example, JP 2008-101502 A discloses a technology of acquiring a blow-through amount of a blow flowing through from a cylinder to an exhaust passage during an overlap period of one cylinder, and injecting, in a cylinder in the expansion stroke in the same period, a fuel for post combustion corresponding to the blow-through amount in addition to a normal fuel injection.

With this technology, by providing control so that the mixture ratio of the blown-through air to the fuel for post combustion is the theoretical air/fuel ratio, the mixture is combusted in the exhaust passage. As a result, the exhaust air temperature increases, and the energy for driving the turbine increases, which results in an enhancement in the charging efficiency. Moreover, the air/fuel ratio is stoichiometric, and hence is not reflected to an exhaust performance.

SUMMARY OF INVENTION

However, with the configuration disclosed in JP 2008-101502 A, the fuel for post combustion is injected in a latter half of the expansion stroke, and hence the hydrocarbons in the fuel are discharged into the exhaust passage while the hydrocarbons remain as higher hydrocarbons having long carbon chains which are relatively less combustible, and atomization may not sufficiently progress until the hydrocarbons are mixed with the blown-through air and are combusted. When a part of the fuel for post combustion is not combusted, the exhaust temperature does not increase as expected, and hence the increment in supercharging efficiency is small. Moreover, the exhaust gas richer than the theoretical air/fuel ratio flows into an exhaust gas purification device, which results in degradation of the exhaust performance.

Therefore, it is an object of this invention to simultaneously realize both an enhancement in the charging efficiency and the exhaust performance in a multi-cylinder internal combustion engine equipped with a supercharger.

A detailed description of this invention as well as other features and advantages thereof is given in the following description of the specification, and is also illustrated in the accompanying drawings.

DESCRIPTION OF EMBODIMENTS

Figure 1:
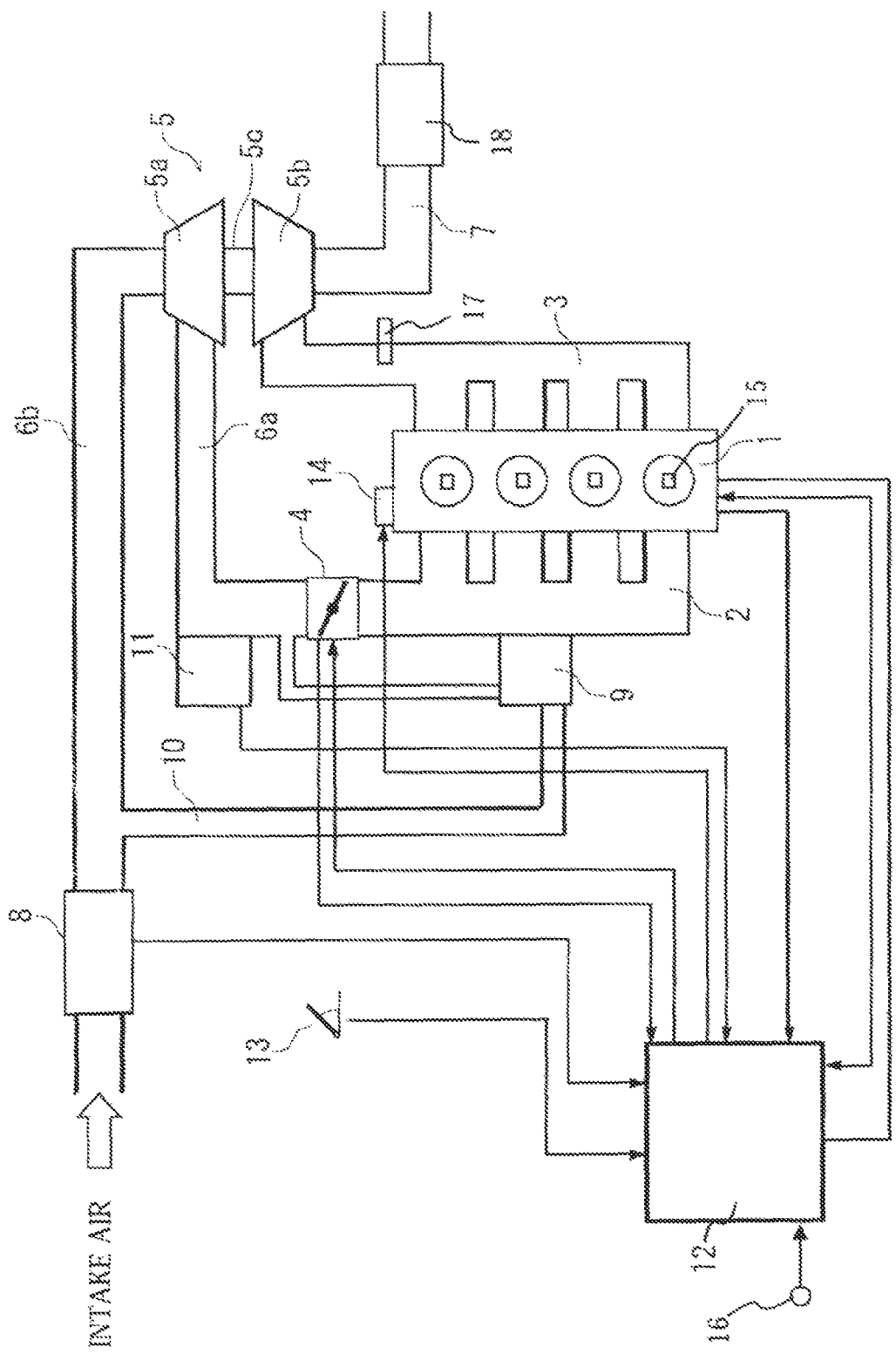
FIG. 1 is a configuration diagram of a system to which an embodiment of this invention is applied.

FIG. 1 is a system configuration diagram of an internal combustion engine to which embodiments of this invention are applied.

At an inlet of an intake manifold 2 of an internal combustion engine 1, a throttle chamber 4 for adjusting an air amount flowing into the internal combustion engine 1 is provided, and an intake passage 6 is connected upstream thereof. On an upstream side of the throttle chamber 4 of the intake passage 6, a compressor 5a of a supercharger 5 is provided, and an air flow meter 8 for detecting an intake air amount is provided further upstream thereof.

In each of the cylinders of the internal combustion engine 1, a fuel injection valve 15 for directly injecting a fuel into the cylinder is provided. In the exhaust passage 7, a turbine 5b of the supercharger 5 is provided.

The supercharger 5 is a so-called turbocharger, and the compressor 5a and the turbine 5b are connected through an intermediation of a shaft 5c. As a result, when the turbine 5b is rotated by exhaust energy of the internal combustion engine 1, the compressor 5a also rotates, thereby pressure-feeding the intake air to the downstream side.

On the downstream side of the turbine 5b, an exhaust gas catalyst 18 for purifying the exhaust gas is provided. As the exhaust gas catalyst 18, a three-way catalyst or the like is used.

A recirculation passage 10 is a passage for connecting an intake passage 6a and an intake passage (hereinafter referred to as intake passage 6b) which is on a downstream side of the air flow meter 8 and on an upstream side of the compressor 5a, and when a recirculation valve 9 provided on the way opens, both the intake passages 6a and 6b communicate to each other, and when the recirculation valve 9 closes, the communication is shut off.

As in a generally known recirculation valve, the recirculation valve 9 opens when a differential pressure between a supercharged pressure and a pressure (hereinafter referred to as intake pipe pressure) in the intake manifold 2 reaches a value equal to or more than a predetermined value. For example, against a valve body provided inside, a reaction force of a built-in spring is biased toward a valve closing direction and further, the supercharged pressure acts in a valve opening direction and the intake pipe pressure acts in the valve closing direction. Then, when the differential pressure between the supercharged pressure and the intake pipe pressure exceeds the reaction force of the spring, the valve opens. As a result, when the throttle chamber 4 is fully opened during a travel in a supercharged state, the supercharged pressure is prevented from excessively increasing. The differential pressure between the supercharged pressure and the intake pipe pressure when the recirculation valve 9 opens may be set to an arbitrary value by a spring constant of the spring.

A valve timing control mechanism 14 only needs to change an intake valve closing (IVC) timing so that the overlap period in which both the exhaust valve and the intake valve are opened is generated. For example, a generally known valve timing control mechanism such as one which changes a rotation phase of an intake cam shaft with respect to a crankshaft or one which changes an operation angle of an intake valve can be used. It should be noted that a similar valve timing control mechanism 14 may be provided on the exhaust valve side, thereby variably controlling the valve timings of the intake valve and the exhaust valve.

A control unit 12 reads parameters relating to operation states such as the intake air amount detected by the air flow meter 8, an accelerator opening detected by an accelerator opening degree sensor 13, and the engine rotation speed detected by a crank angle sensor (not shown), and controls an ignition timing, a valve timing, an air/fuel ratio, and the like based on those parameters.

A description is now given of valve timing control and air/fuel ratio control carried out by the control unit 12.

When the pressure in the intake manifold 2 is higher than the pressure in the exhaust manifold 3, the control unit 12 activates the valve timing control mechanism 14 so as to provide a valve timing for generating a valve overlap period in which the intake valve and the exhaust valve are opened.

The activation is carried out so as to use a so-called scavenging effect in which new air flowing into the intake manifold 2 serves as scavenging gas and directly flows to the exhaust manifold 3 during the valve overlap period to increase the rotation speed of the turbine 5$b$, thereby enhancing a charging efficiency in the cylinder.

Figure 2:
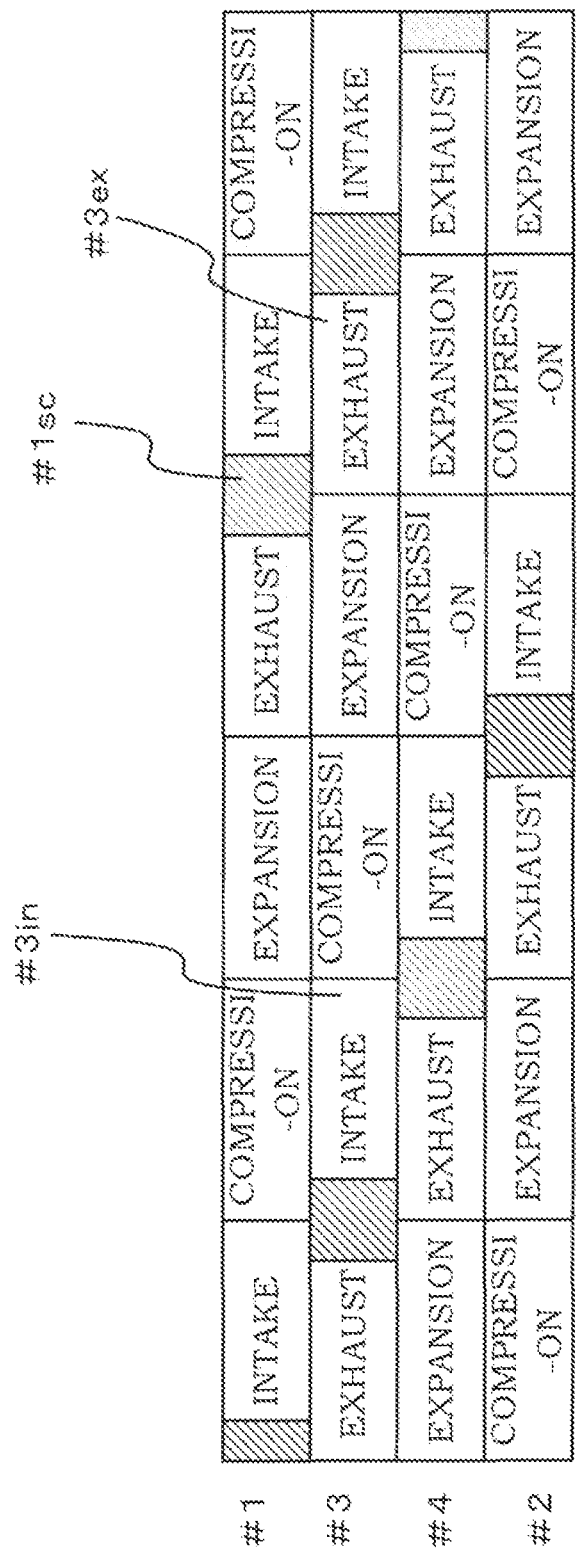
FIG. 2 is a diagram illustrating a stroke sequence of an inline four-cylinder internal combustion engine.

Referring to FIG. 2, a specific description is now given of the effect. FIG. 2 illustrates a stroke sequence of an inline four-cylinder internal combustion engine having an ignition sequence of a first cylinder, a third cylinder, a fourth cylinder, and a second cylinder. Hatched portions in the figure represent the valve overlap periods.

When the valve overlap period is provided, in the exhaust manifold 3, the exhaust gas exhausted from a cylinder in the exhaust stroke and the scavenging gas in another cylinder in the intake stroke on this occasion merge. For example, the exhaust gas exhausted in an exhaust stroke #3$ex$ of the third cylinder of FIG. 2 and the scavenging gas scavenged in a valve overlap period #1$sc$ of the first cylinder in the intake stroke on this occasion merge.

As a result, compared with a case where the valve overlap period is not provided, in other words, the scavenging is not carried out, the gas amount introduced into the turbine 5$b$ increases. As a result, the rotation speed of the turbine 5$b$ increases, and the supercharged pressure provided by the compressor 5$a$ increases. Moreover, the scavenging discharges a residual gas in the cylinder along with the new air gas, and as a result, the charging efficiency of the new air in the cylinder is enhanced.

Further, according to this embodiment, air/fuel ratio control, which is described later, combusts the mixture of the exhaust gas and the scavenging gas merging in the exhaust manifold 3 before the mixture flows into the turbine 5$b$, thereby further increasing the energy for rotating the turbine 5$b$.

As a result, the fuel injection amount is set so that the mixture of the exhaust gas exhausted during the exhaust stroke from a certain cylinder and the scavenging gas scavenged during the valve overlap period from a cylinder which is in the intake stroke in the same period provides an air/fuel ratio facilitating the combustion before the mixture flows into the turbine 5$b$. In other words, the fuel injection amount is set so that the air/fuel ratio in the cylinder is set to an air/fuel ratio richer than the theoretical air fuel ratio, the exhaust gas containing unburnt hydrocarbon is exhausted, and the exhaust gas and the scavenging gas are mixed, which results in an air/fuel ratio facilitating the combustion, for example, the theoretical air/fuel ratio.

For example, a fuel injection amount corresponding to an air amount taken in in an intake stroke #3$in$ of the third cylinder of FIG. 2 is set so that an air/fuel ratio facilitates the combustion of a mixture of an exhaust gas exhausted in an exhaust stroke #3$ex$ of the third cylinder and an scavenging gas exhausted in a valve overlap period #1$sc$ of the first cylinder. In other words, when the air/fuel ratio in the third cylinder is focused on, the air/fuel ratio is richer than the theoretical air/fuel ratio, and the exhaust gas containing the unburnt fuel is exhausted in the exhaust stroke.

The fuel injection amount set as described above is entirely injected by a single fuel injection per stroke. The fuel injection period is set after the end of the valve overlap period in the intake stroke, namely, after the exhaust valve is closed, or in the compression stroke. It should be noted that the air/fuel ratio control is described in detail later.

When the injection is carried out in this way, the fuel which serves as the unburnt hydrocarbon in the exhaust gas receives combustion heat in the expansion stroke, and changes from higher hydrocarbons long in carbon chain to lower hydrocarbons shorter in carbon chain, which results in a higher combustion property. Moreover, the air/fuel ratio in the cylinder becomes richer than the theoretical air/fuel ratio so that the air/fuel ratio comes closer to the power air/fuel ratio, and hence the output can increase compared with the case of the operation at the theoretical air/fuel ratio. Further, the inside of the cylinder is cooled by the latent heat of vaporization when the fuel vaporizes in the cylinder, which contributes to an enhancement of the charging efficiency.

Figure 3:
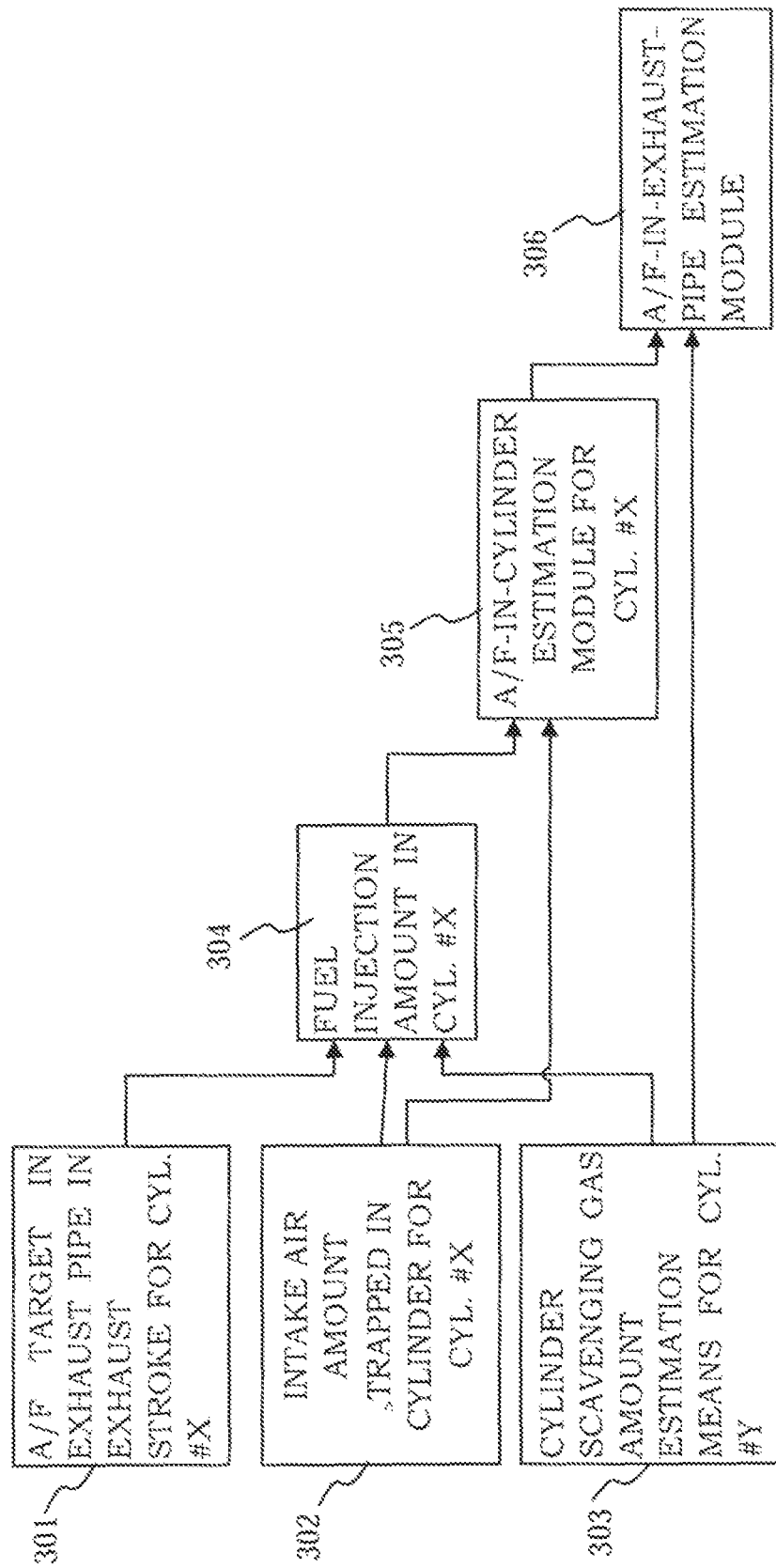
FIG. 3 is a block diagram illustrating details of calculation for setting a fuel injection amount carried out by a control unit.

FIG. 3 is a block diagram illustrating details of calculation for setting a fuel injection amount to be injected into the cylinder. It should be noted that the block diagram includes estimation of air/fuel ratios in the cylinder and the exhaust manifold 3 by using the set fuel injection amount.

An air/fuel-ratio-in-exhaust-pipe target value setting module 301 sets a target air/fuel ratio in exhaust pipe, which is a target air/fuel ratio in the exhaust manifold 3. The target air fuel ratio is set to an air/fuel ratio facilitating the combustion of the mixture of the exhaust gas and the scavenging gas, such as the theoretical air/fuel ratio.

The target air/fuel ratio is not limited to the theoretical air/fuel ratio, and may be set so that the mixture of the exhaust gas and the scavenging gas has an air/fuel ratio satisfying a required value of the exhaust performance, namely, an air/fuel ratio to a level which does not decrease a conversion efficiency of the exhaust gas catalyst 18. Even in this case, the scavenging effect enhances the charging efficiency in the cylinder and a generated torque increases, and further, the exhaust performance is prevented from decreasing.

An intake-air-amount-trapped-in-cylinder estimation module 302 estimates, based on an intake air amount detected by the air flow meter 8 and a scavenging rate, an intake air amount trapped in cylinder which is an amount trapped in the cylinder at the finish of the intake stroke out of the intake air amount. It should be noted that the scavenging rate is a value acquired by dividing the new air amount by a gas amount in cylinder. A description is given later of how to calculate the scavenging rate.

A cylinder scavenging gas amount estimation module 303 estimates, for a cylinder which is in the intake stroke when the cylinder for which the intake air amount trapped in cylinder is calculated is in the exhaust stroke, a cylinder scavenging gas amount which is an amount flowing out to the exhaust manifold 3 during the valve overlap period out of the intake air amount based on the scavenging rate and the intake air amount.

A fuel-injection-amount-into-cylinder setting module 304 determines the fuel injection amount to be injected into the cylinder based on the target air/fuel ratio in exhaust pipe, the intake air amount trapped in cylinder, and the cylinder scavenging gas amount.

When the exhaust gas is mixed with the scavenging gas in the exhaust manifold 3, the air/fuel ratio changes toward the lean side by an amount corresponding to dilution by the scavenging gas. For example, when the fuel injection amount is set so as to realize the theoretical air/fuel ratio for the intake air amount trapped in cylinder, the air/fuel ratio of the exhaust gas reaches the theoretical air/fuel ratio, and when the exhaust gas is mixed with the scavenging gas in the exhaust manifold 3, the air/fuel ratio becomes leaner than the theoretical air/fuel ratio.

Thus, a hydrocarbon amount required to attain the target air/fuel ratio in exhaust pipe when the exhaust gas is diluted by the scavenging gas is acquired based on the intake air amount trapped in cylinder and the scavenging gas amount, and a fuel injection amount required to generate the hydrocarbon amount is set based on the intake air amount trapped in cylinder.

An air/fuel-ratio-in-cylinder estimation module 305 estimates the air/fuel ratio in the cylinder based on the fuel injection amount and the intake air amount trapped in cylinder. An air/fuel-ratio-in-exhaust-pipe estimation module 306 estimates the air/fuel ratio in the exhaust manifold 3 based on the air/fuel ratio in cylinder and the cylinder scavenging gas amount. When the fuel injection amount in cylinder is controlled by means of feedback based on those estimated values and the target air/fuel ratio in exhaust pipe, the air/fuel ratio in the exhaust manifold 3 can be controlled more highly accurately.

Figure 4:
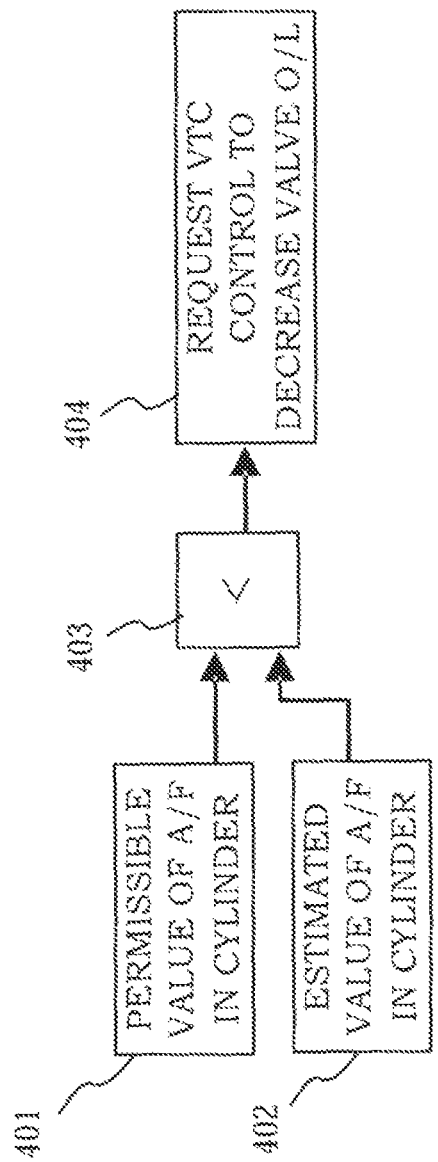
FIG. 4 is a block diagram of control of determining whether or not to reduce a valve overlap period carried out by the control unit.

FIG. 4 is a block diagram of control of determining whether or not to reduce the valve overlap period based on the estimated value of air/fuel ratio in cylinder acquired by the air/fuel-ratio-in-cylinder estimation module 305. As the scavenging amount increases, the fuel amount required for the air/fuel ratio in exhaust pipe to reach the desired air/fuel ratio increases, which is accompanied by the air/fuel ratio in the cylinder changing toward the rich side. Then, when the fuel injection amount acquired by the calculation of FIG. 3 causes the air/fuel ratio in the cylinder to exceed the combustion limit, calculation of FIG. 4 is carried out in order to reduce the scavenging amount by reducing the valve overlap period.

An air/fuel-ratio-permissible-value-in-cylinder calculation module 401 sets a permissible value of air/fuel ratio in cylinder acquired based on conditions such as the combustion limit. An air/fuel-ratio-in-cylinder estimation module 402 reads the air/fuel ratio in cylinder estimated by the air/fuel-ratio-in-cylinder estimation module 305 of FIG. 3.

A determination module 403 compares the permissible value of air/fuel ratio in cylinder and the estimated value of air/fuel ratio in cylinder with each other, and when the determination module 403 determines that the estimated value of air/fuel ratio in cylinder is richer, the determination module 403 requests a VTC control module 404, which is a control module of the valve timing control mechanism 14, to reduce the valve overlap period.

By the control illustrated in FIGS. 3 and 4, the air/fuel ratio of the mixture of the exhaust gas and the scavenging gas in the exhaust manifold 3 can be controlled to be an air/fuel ratio facilitating the combustion, and combustion stability in the cylinder can be secured.

Now, a description is given of the scavenging rate used in FIG. 3 for estimating the intake air amount trapped in cylinder and the cylinder scavenging gas amount in cylinder.

Figure 5:
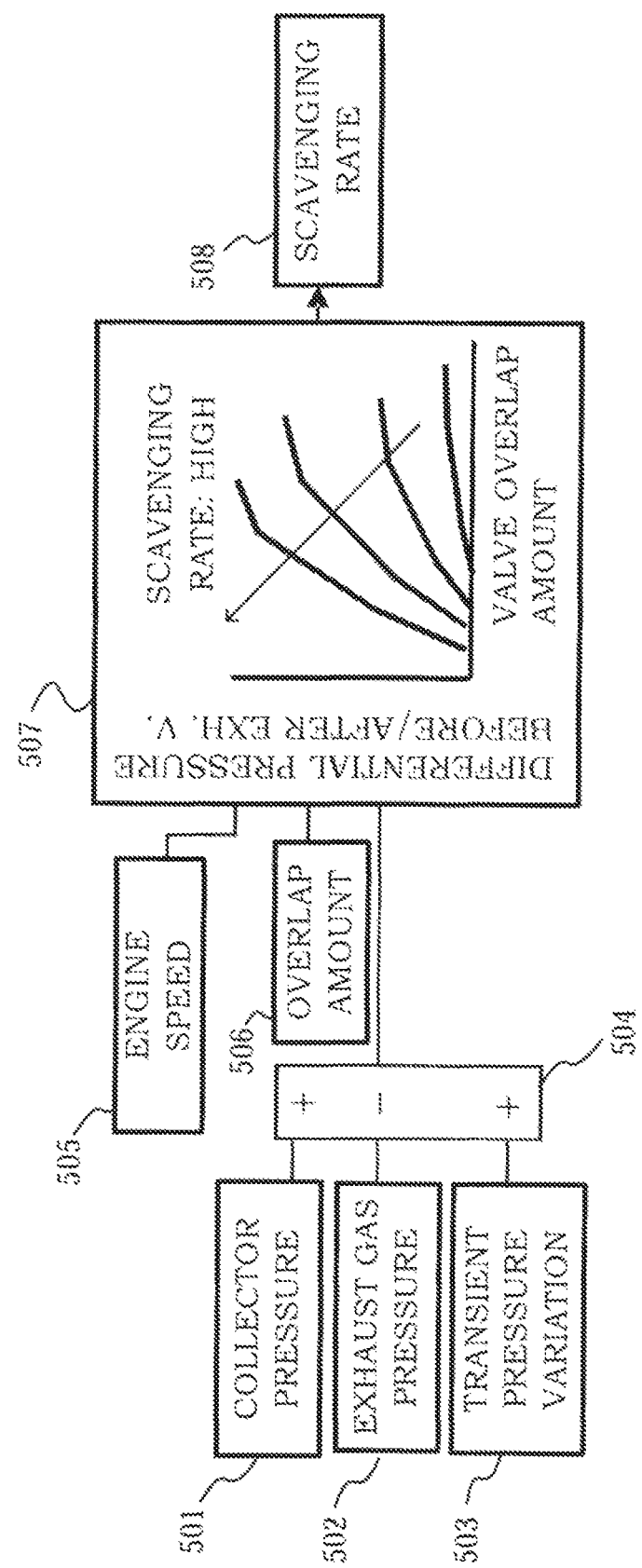
FIG. 5 is a block diagram illustrating details of calculation for acquiring a scavenging rate carried out by the control unit.

FIG. 5 is a block diagram illustrating details of calculation for acquiring a scavenging rate.

During the steady state operation, the scavenging rate is determined based on the engine rotation speed, a heat generation amount determined by the intake air amount, and a gas amount passing through the exhaust manifold 3. However, an increase in the rotation speed of the turbine 5b delays with respect to an increase in speed of the gas amount flowing through the exhaust manifold 3 during a transient operation, which results in a pressure loss. As a result, the exhaust gas pressure during the transient operation is higher than an exhaust gas pressure during the steady operation with the same intake air amount and the same engine rotation speed. Thus, the calculation of FIG. 5 calculates the scavenging rate by correcting the exhaust gas pressure during the steady state operation by an increase/decrease amount of an exhaust gas pressure variation amount (hereinafter referred to as transient pressure variation) during the transient operation.

A collector pressure read module 501 reads the pressure in the intake manifold 2 as a collector pressure. An exhaust gas pressure read module 502 reads an exhaust gas pressure acquired by calculation to be described later. A transient pressure variation read module 503 reads a transient-exhaust-gas-pressure-variation amount acquired by calculation to be described later.

A differential-pressure-before/after-exhaust-valve calculation module 504 subtracts the exhaust gas pressure from the collector pressure, and adds the transient pressure variation thereto, thereby calculating a differential pressure before/after exhaust valve. As a result, the differential pressure before/after exhaust valve containing the transient-exhaust-gas-pressure-variation amount is calculated.

On the other hand, an engine rotation speed read module 505 reads the engine rotation speed based on a detected value obtained by the crank angle sensor, and an overlap amount read module 506 reads a valve overlap amount acquired by calculation to be described later.

Then, a scavenging rate calculation module 507 acquires the scavenging rate by using a map set in advance based on the engine rotation speed, the valve overlap amount, and the differential pressure before/after exhaust valve, and a scavenging rate setting module 508 reads the calculation result as the scavenging rate. As illustrated in FIG. 5, the map used on this occasion has a vertical axis representing the differential pressure before/after exhaust valve, and a horizontal axis representing the valve overlap amount, and the control unit 12 stores a plurality of the maps for respective engine rotation speeds.

Figure 6:
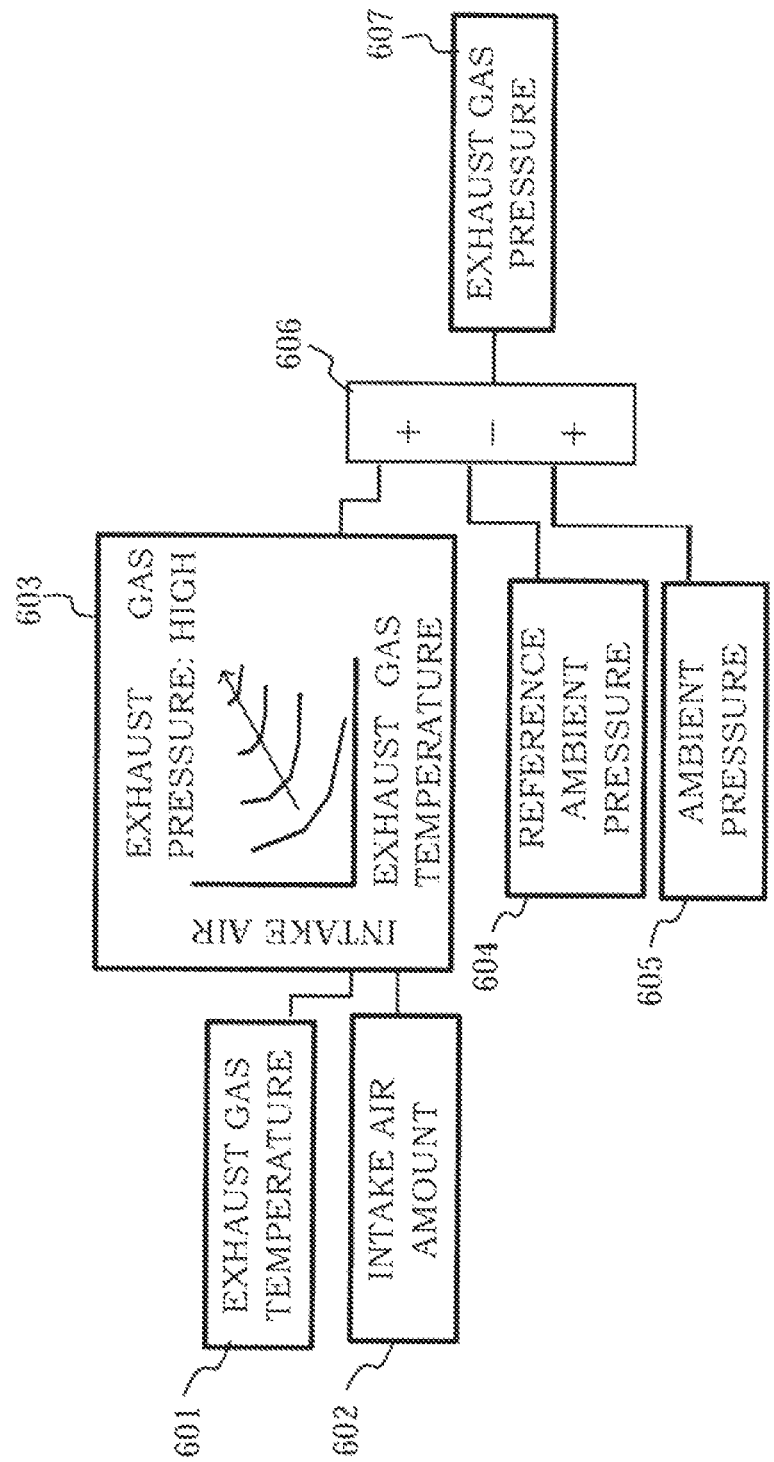
FIG. 6 is a block diagram illustrating details of calculation for acquiring an exhaust gas pressure carried out by the control unit.

FIG. 6 is a block diagram illustrating details of calculation for acquiring the exhaust gas pressure read by the exhaust gas pressure read module 502. The exhaust gas pressure is greatly influenced by the ambient pressure and the exhaust gas temperature, and hence, by carrying out a correction based thereon, an estimation accuracy of the exhaust gas pressure can be enhanced, and further, the estimation accuracy of the scavenging rate can also be enhanced. Specifically, the following calculation is carried out.

An exhaust gas temperature read module 601 reads the detected value obtained by the exhaust gas temperature sensor 17, and an intake air amount read module 602 reads the detected value obtained by the air flow meter 8. A reference exhaust gas pressure calculation module 603 calculates, based on the read values, an exhaust gas pressure serving as a reference by using a map generated in advance. As a result, the exhaust gas pressure based on the intake air amount and the exhaust gas temperature can be used as the reference value.

On the other hand, a reference ambient pressure read module 604 reads a detected value obtained by the ambient pressure sensor 16 when the reference exhaust gas pressure is calculated. Further, an ambient pressure read module 605 reads a current detected value obtained by the ambient pressure sensor 16. Then, an ambient pressure correction module 606 calculates a sum of a value acquired by subtracting the reference ambient pressure from the reference exhaust gas pressure and the ambient pressure, and an exhaust gas pressure calculation module 607 reads the calculation result as the exhaust gas pressure. As a result, the exhaust gas pressure based on the ambient pressure can be estimated.

Figure 7:
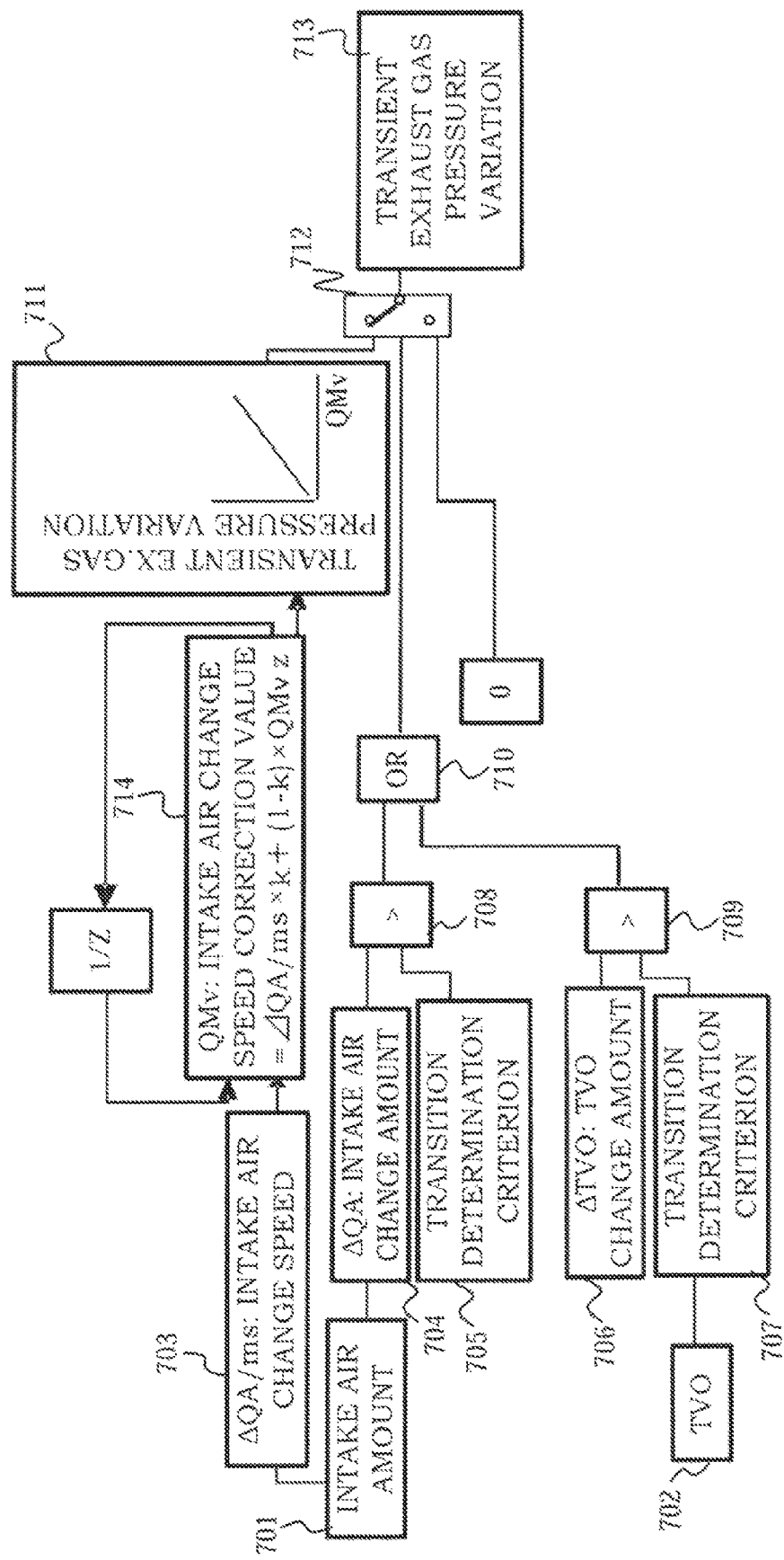
FIG. 7 is a block diagram illustrating details of calculation for acquiring a transient exhaust gas pressure variation carried out by the control unit.

FIG. 7 is a block diagram for calculating the transient-exhaust-gas-pressure-variation amount read by the transient pressure variation read module.

On this occasion, the transient-exhaust-gas-pressure-variation amount is calculated by using change amounts of the intake air amount and the throttle valve opening as a trigger for determining whether or not the operation state is a transient operation state.

An intake air amount read module 701 reads a detected value obtained by the air flow meter 8. A throttle valve opening read module 702 reads the throttle opening. The throttle valve opening may be detected by a throttle position sensor, or, for an electronically controlled throttle, an instruction value directed to an actuator for driving the throttle valve may be read.

An intake air change speed calculation module 703 calculates, based on the intake air amount read by the intake air amount read module 701, an intake air change speed $\Delta QA/ms$ which is a change speed of the intake air amount per millisecond. An intake air change speed correction value calculation module 714 calculates a value obtained by imparting a first order delay to the intake air change speed $\Delta QA/ms$ by using the following equation (1) as an intake air change speed correction value QMv.

$$QMv = \Delta QA/ms \times k + (1-k) \times QMvz \quad (1)$$

A transient-exhaust-gas-pressure-variation amount estimation module 711 calculates, based on the intake air change speed correction value QMv acquired as described above, a transient exhaust gas pressure serving as a reference by using a map generated in advance, and inputs the calculation result to a switch module 712.

An intake-air-amount change amount calculation module 704 calculates a change amount of the intake air amount, and a first determination module 708 compares a first transient determination criterion stored in advance in a first transient determination criterion setting module 705 and the intake-air-amount change amount with each other.

A throttle-valve-opening change amount calculation module 706 calculates a change amount of the throttle valve opening, and a second determination module 709 compares a second transient determination criterion stored in advance in a second transient determination criterion setting module 707 and the throttle-valve-opening change amount with each other.

A third determination module 710 reads determination results of the first determination module 708 and the second determination module 709. Then, when at least one of a determination that the intake-air-amount change amount is larger than the first transient determination criterion in the first determination module 708 and a determination that the throttle-valve-opening change amount is larger than the second transient determination criterion in the second determination module 709 is made, the third determination module 710 determines that the operation state is a transient operation state. The determination result is input to the switch module 712, and when the operation state is a transient operation state, the switch module 712 switches to a side of adding the transient exhaust gas pressure variation, and when the operation state is not a transient operation state, the switch module 712 switches to a side of not adding the transient-exhaust-gas-pressure-variation amount. A transient-exhaust-gas-pressure-variation determination module 713 sets the value output from the switch module 712 as the transient-exhaust-gas-pressure-variation amount.

Figure 8:
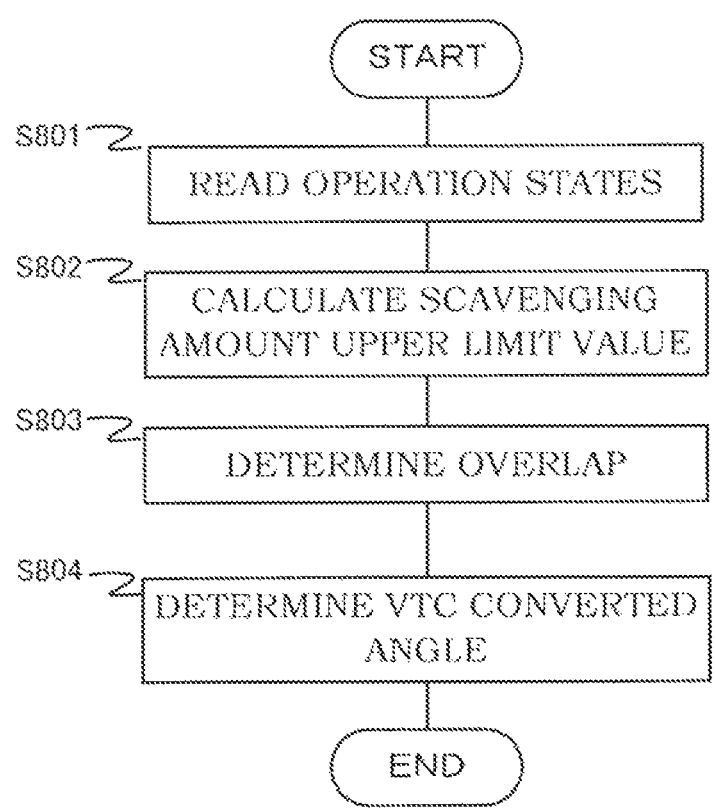
FIG. 8 is a block diagram illustrating details of calculation for determining a converted angle for a valve timing control mechanism carried out by the control unit.

FIG. 8 is a flowchart illustrating a control routine for determining a converted angle for the valve timing control mechanism 14. In the course of the control, the valve overlap period is calculated.

In Step S801, the control unit 12 reads operation states of the internal combustion engine 1 such as the collector pressure, the engine rotation speed, the intake air temperature, the ambient pressure, and a basic injection pulse.

In Step S802, the control unit 12 calculates a scavenging amount upper limit value determined from the operation states. A description is now given of an example of how to acquire the scavenging amount upper limit value.

Figure 9:
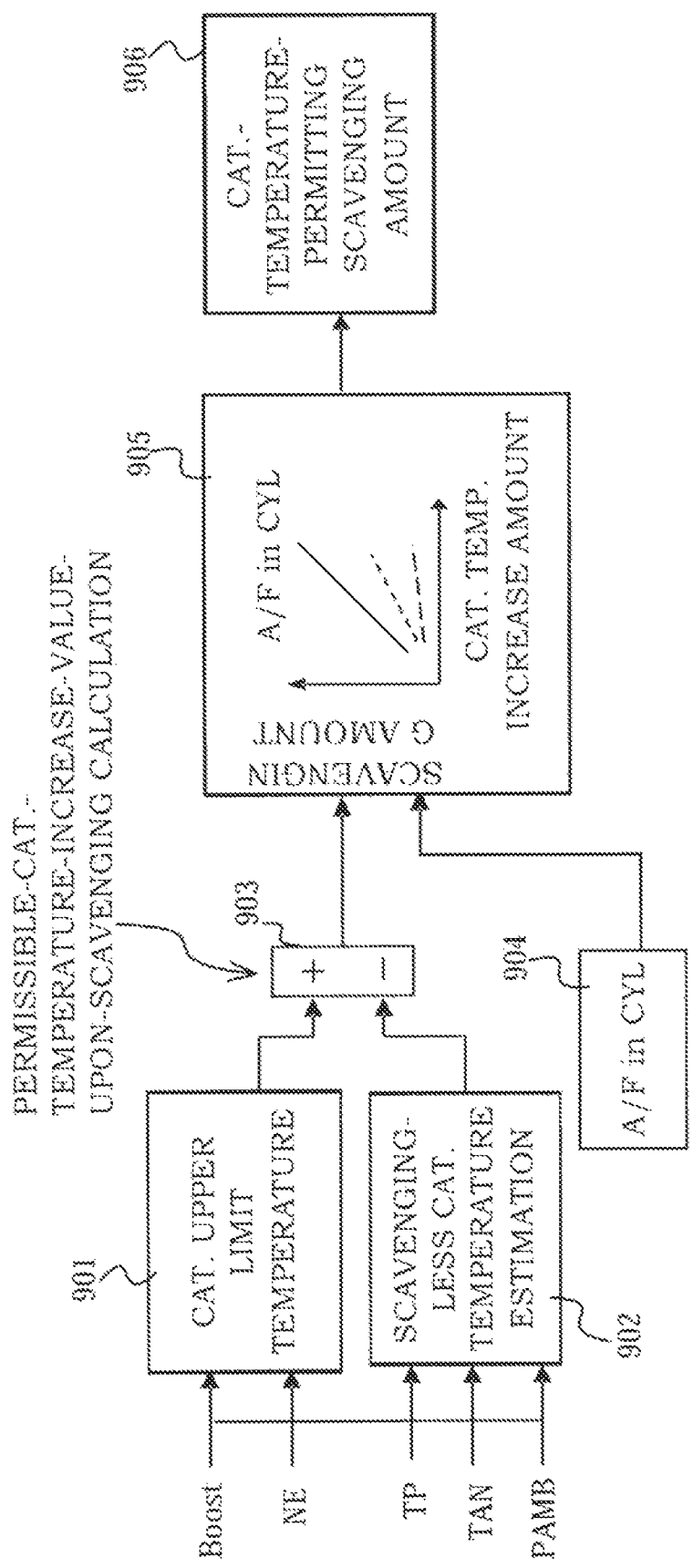
FIG. 9 is a block diagram for calculating a scavenging amount upper limit value based on a catalyst temperature carried out by the control unit.

FIG. 9 is a block diagram for calculating the scavenging amount upper limit value based on a catalyst temperature.

When the fuel is injected so that the air/fuel ratio in the exhaust manifold 3 including the scavenged portion is the theoretical air/fuel ratio, thereby combusting the mixture of the exhaust gas and the scavenging gas in the exhaust manifold 3, the temperature of the exhaust gas catalyst 18 by the combustion can increase more as the scavenging amount increases. The exhaust gas catalyst 18 degrades in an exhaust gas purification capability when the temperature excessively increases, and hence the upper limit for the scavenging amount is set to restrain the temperature increase of the exhaust gas catalyst 18.

It should be noted that, as the operation states, the collector pressure Boost, the engine rotation speed NE, a basic injection pulse TP, the intake air temperature TAN, and the ambient pressure PAMB are read.

A catalyst upper limit temperature calculation module 901 calculates a catalyst upper limit temperature which is an upper limit temperature of the exhaust gas catalyst 18 determined by the operation states. Similarly, a scavenging-less catalyst upper limit temperature calculation module 902 calculates a scavenging-less catalyst estimated temperature which is an estimated temperature of the exhaust gas catalyst 18 in a normal operation state without the scavenging, namely, an operation state where the mixture of the scavenging gas and the exhaust gas is not combusted.

A permissible-catalyst-temperature-increase-value-upon-scavenging calculation module 903 calculates a permissible catalyst temperature increase value upon scavenging, which is a difference between the catalyst upper limit temperature and the scavenging-less catalyst estimated temperature. An increase in temperature of the exhaust gas catalyst 18 upon the scavenging can be permitted by an amount corresponding to the permissible catalyst temperature increase value upon scavenging.

A catalyst-temperature-permitting scavenging amount calculation module 905 calculates, based on the permissible catalyst temperature increase value upon scavenging and the air/fuel ratio in the cylinder of the internal combustion engine 1 acquired by a cylinder internal air/fuel ratio calculation module 904, by using a map generated in advance, a catalyst-temperature-permitting scavenging amount which is a scavenging amount upper limit value determined by the temperature of the exhaust gas catalyst 18. The map used on this occasion is a map representing a relationship between the scavenging amount and a catalyst temperature increase amount for each cylinder internal air/fuel ratio.

Then, a catalyst-temperature-permitting scavenging amount determination module 906 sets the calculated result as a catalyst-temperature-permitting scavenging amount.

In Step S803 of FIG. 8, the control unit 12 determines a valve overlap period based on the scavenging amount acquired in Step S802. When the scavenging amount and the valve overlap period are acquired in advance based on specifications of an internal combustion engine subject to the application, the valve overlap period can be easily set based on the scavenging amount. Further, the overlap amount read module 506 of FIG. 5 reads this value.

In Step S804, the control unit 12 determines the converted angle of the valve timing control mechanism 14 in order to realize the valve overlap period determined in Step S803. When a relationship between the valve overlap period and the converted angle is acquired in advance based on profiles and the like of the intake cam and the exhaust cam of the internal combustion engine 1 subject to the application, the converted angle can be easily determined based on the valve overlap period.

When the fuel injection amount is set by the calculation of FIG. 3 as described above, the mixture of the scavenging gas and the exhaust gas mixed in the exhaust manifold 3 may be controlled to be an air/fuel ratio facilitating the combustion.

Though a description has been given of the case where the internal combustion engine 1 is an in-cylinder direct injection type in this embodiment, the internal combustion engine 1 is not limited to this type, and this embodiment can be applied to a so-called port-injection type internal combustion engine which injects a fuel toward an intake port communicating to the cylinder. In the case of the port-injection type internal combustion engine, when the fuel injection is carried out after the valve overlap period finishes, in other words, when the exhaust valve is closed, the injected fuel is not exhausted to the exhaust manifold 3 along with the scavenging gas, and the above-mentioned setting method for the fuel injection amount can thus be directly applied.

Moreover, in FIG. 3, the cylinder scavenging gas amount estimation module 303 estimates the cylinder scavenging gas amount for a cylinder which is in the intake stroke when the cylinder for which the intake air amount trapped in cylinder is calculated is in the exhaust stroke. This configuration is set to cover a transient operation state. However, in the case of the steady operation, the intake air amount trapped in cylinder and the cylinder scavenging gas amount are the same for any cylinders, and hence the fuel injection amount can also be determined by using the cylinder scavenging gas amount of the same cylinder as the cylinder for which the intake air amount trapped in cylinder is calculated.

Figure 10:
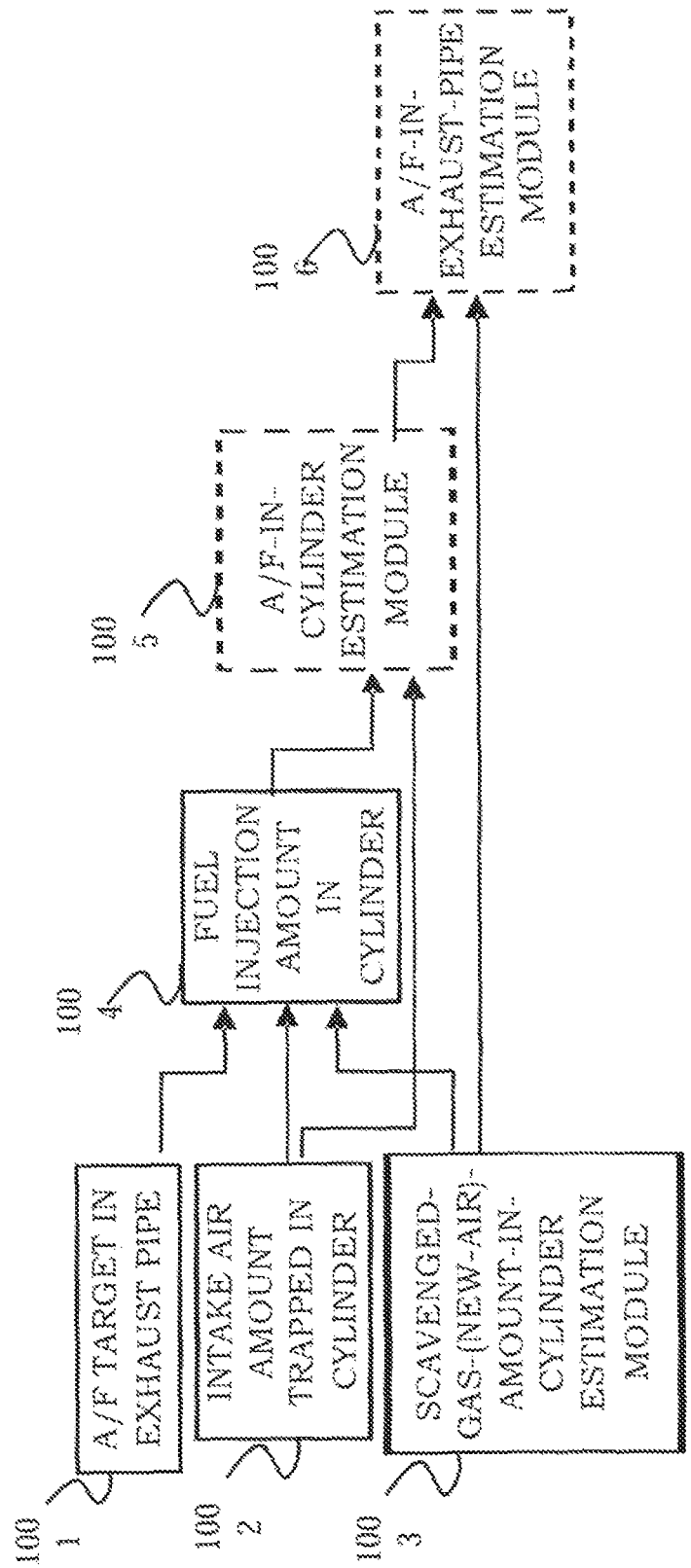
FIG. 10 is a block diagram illustrating details of calculation carried out by the control unit for determining a fuel injection amount based on a scavenging gas amount and an exhaust gas amount of one cylinder, thereby estimating an air/fuel ratio in cylinder and an air/fuel ratio in exhaust pipe.

FIG. 10 is a block diagram illustrating details of calculation carried out for determining a fuel injection amount based on the scavenging gas amount and the exhaust gas amount of one cylinder, thereby estimating the air/fuel ratio in cylinder and the air/fuel ratio in exhaust pipe. While the cylinder scavenging gas amount estimation module 303 of FIG. 3 estimates the cylinder scavenging gas amount for a cylinder which is in the intake stroke when a cylinder for which the cylinder trapped intake air amount is calculated is in the exhaust stroke, in FIG. 10, the scavenging gas amount for the same cylinder as the cylinder for which the cylinder trapped intake air amount is calculated is estimated.

A description is now given of effects of this embodiment.

The control unit 12 determines the fuel injection amount for one cylinder so that the exhaust gas exhausted in the exhaust stroke of the cylinder and richer than the theoretical air/fuel ratio and the scavenging gas scavenged during the valve overlap period from another cylinder which is in the intake stroke when the one cylinder is in the exhaust stroke are mixed so as to reach a desired air/fuel ratio. As a result, the charging efficiency is increased by the scavenging effect, thereby increasing the generated torque of the internal combustion engine 1. Moreover, the air/fuel ratio of the exhaust gas is prevented from becoming leaner by the new air serving as the scavenging gas, and the conversion efficiency of the exhaust gas catalyst 18 can thus be prevented from degrading.

The control unit 12 sets the fuel injection amount for the one cylinder based on a new air amount when the intake stroke of the one cylinder finishes and a new air amount in the scavenging gas scavenged from the another cylinder which is in the intake stroke when the one cylinder is in the exhaust stroke. As a result, even in a transient operation in which pressures before and after the exhaust valve of each of the cylinders successively change, the air/fuel ratio in the exhaust manifold 3 can be accurately controlled.

The control unit 12 provides such control that the fuel injection amount is injected by a fuel injection once in one stroke, and hence such effects as an enhancement in charging efficiency by the latent heat of vaporization, and an enhancement in a reaction property of the unburnt hydrocarbon can be provided.

The control unit 12 estimates the air/fuel ratio in the cylinder based on the fuel injection amount, and restricts the scavenging amount when the air/fuel ratio in the cylinder exceeds a predetermined value set based on any of a combustion stability limit, a smoke generation limit, and a rich misfire limit in the cylinder. As a result, an operation property and the exhaust performance can be realized at the same time.

The control unit 12 sets the air/fuel ratio in the exhaust manifold 3 based on an output request or an exhaust performance request for the internal combustion engine 1. As a result, a large amount of scavenging, which is restricted for such a reason that the scavenging gas cools the exhaust air catalyst 18 to decrease the conversion efficiency, is no longer restricted.

A description is now given of another embodiment.

According to this embodiment, in order to control the air/fuel ratio of the exhaust gas to attain the theoretical air/fuel ratio, the fuel injection amount is set in consideration of the exhaust amount. While the timing of the fuel injection is after the exhaust valve is closed in the intake stroke, or is in the compression stroke, the timing when the injected fuel and the scavenged air of another cylinder meet each other is between the expansion stroke and the exhaust stroke of the cylinder into which the fuel is injected, and there is thus a delay.

Referring to FIG. 2, a description is again given by taking the fuel injection for the third cylinder and the scavenging for the first cylinder as an example.

While the fuel injection timing #3*in* of the third cylinder is after the exhaust valve is closed in the intake stroke, or is in the compression stroke, the timing when the injected fuel by the injection and the scavenged air meet each other is the valve overlap period #1*sc* of the first cylinder, and there is thus a delay corresponding to three strokes.

On this occasion, in a case where the internal combustion engine 1 is accelerating, even when the fuel injection amount is calculated in the timing #3*in* of the fuel injection for the third cylinder, the actual scavenging amount may increase as the engine rotation speed increases.

Thus, according to this embodiment, when the control unit 12 calculates the fuel injection amount in the timing #3*in* of the fuel injection for the third cylinder, the control unit 12 increases the injection amount based on a degree of the acceleration.

It is only necessary to increase the injection amount as the degree of acceleration increases. Moreover, the scavenging amount for calculating the injection amount may be corrected based on the degree of acceleration.

It should be noted that the degree of acceleration can be calculated based on any of a change speed of a throttle opening, a change speed of an intake air amount, and a change speed of a vehicle speed.

In the above-mentioned embodiment, a description has been given of the internal combustion engine of the in-cylinder direct injection type, but this embodiment may be applied to a so-called port injection type internal combustion engine which injects the fuel toward the intake port. Specifically, in the port injection type internal combustion engine, the intake valve is closed after the compression stroke and hence the method of additionally injecting the fuel after the expansion stroke cannot control the air/fuel ratio in the exhaust manifold, but the fuel injection is once in one stroke in this embodiment, and the fuel injection timing may be after the valve overlap period is finished in the intake stroke. In this manner, this embodiment can be applied to the port injection type internal combustion engine.

Though a description has been given of the embodiments of this invention, the embodiments describe only a part of application examples of this invention, and are not intended to limit the technical scope of this invention to the specific configurations of the above-mentioned embodiments.

This application claims priority from Japanese Patent Application No. 2011-24138, filed on Feb. 7, 2011 in the Japan Patent Office, the entire disclosure of which is incorporated herein by reference.

The invention claimed is:

1. A control device for a multi-cylinder internal combustion engine, comprising:
    a supercharger to be driven by exhaust gas energy; and
    a fuel injection control unit,
    wherein the fuel injection control unit sets a fuel injection amount for one cylinder so that an air/fuel ratio in the one cylinder is richer than a theoretical air/fuel ratio, such that exhaust gas exhausted when the one cylinder is in an exhaust stroke and scavenging gas scavenged during a valve overlap period from another cylinder which is in an intake stroke when the one cylinder is in the exhaust stroke are mixed in an exhaust pipe so as to attain a desired air/fuel ratio.

2. The control device for a multi-cylinder internal combustion engine according to claim 1, wherein the fuel injection control unit sets the fuel injection amount for the one cylinder based on a new air amount when an intake stroke of the one cylinder finishes and a new air amount in the scavenging gas scavenged from the another cylinder which is in the intake stroke when the one cylinder is in the exhaust stroke.

3. The control device for a multi-cylinder internal combustion engine according to claim 1, wherein the fuel injection control unit provides such control that the fuel injection amount is injected by a fuel injection once in one stroke.

4. The control device for a multi-cylinder internal combustion engine according to claim 1, further comprising a scavenging amount control unit configured to determine a scavenging amount based on a combustion state in a cylinder,
    wherein the scavenging amount control unit estimates an air/fuel ratio in the cylinder based on the fuel injection amount, and restricts the scavenging amount when the air/fuel ratio in the cylinder exceeds a predetermined value set based on any of a combustion stability limit, a smoke generation limit, and a rich misfire limit in the cylinder.

5. The control device for a multi-cylinder internal combustion engine according to claim 1, wherein the fuel injection control unit sets the desired air/fuel ratio based on an output required value of the multi-cylinder internal combustion engine or a required value for an exhaust performance of the multi-cylinder internal combustion engine.

6. The control device for a multi-cylinder internal combustion engine according to claim 1, wherein the fuel injection control unit corrects the fuel injection amount based on a degree of acceleration.

7. The control device for a multi-cylinder internal combustion engine according to claim 6, wherein the fuel injection control unit calculates the degree of acceleration based on any of a change speed of a throttle opening, a change speed of an intake air amount, and a change speed of a vehicle speed.

8. A control device for a multi-cylinder internal combustion engine, comprising:
    a supercharger to be driven by exhaust gas energy; and
    fuel injection control means for setting a fuel injection amount for one cylinder so that an air/fuel ratio in the one cylinder is richer than a theoretical air/fuel ratio, and exhaust gas exhausted when the one cylinder is in an exhaust stroke and scavenging gas scavenged during a valve overlap period from another cylinder which is in an intake stroke when the one cylinder is in the exhaust stroke are mixed in an exhaust pipe so as to attain a desired air/fuel ratio.

* * * * *